United States Patent
Noriyuki

(10) Patent No.: US 7,386,360 B2
(45) Date of Patent: Jun. 10, 2008

(54) DEVICE, METHOD, AND PROGRAM FOR LOOP SIMULATION

(75) Inventor: Suzuki Noriyuki, Wakayama (JP)

(73) Assignee: Shima Seiki Manufacturing, Ltd., Wakayama (JP)

( * ) Notice: Subject to any disclaimer, the term of this patent is extended or adjusted under 35 U.S.C. 154(b) by 0 days.

(21) Appl. No.: 10/575,788

(22) PCT Filed: Sep. 9, 2004

(86) PCT No.: PCT/JP2004/013107

§ 371 (c)(1),
(2), (4) Date: Apr. 14, 2006

(87) PCT Pub. No.: WO2005/038117

PCT Pub. Date: Apr. 28, 2005

(65) Prior Publication Data

US 2007/0088453 A1    Apr. 19, 2007

(30) Foreign Application Priority Data

Oct. 15, 2003    (JP)    .............................. 2003-355162

(51) Int. Cl.
*G06F 19/00* (2006.01)
(52) U.S. Cl. .................... 700/131; 700/141; 66/232
(58) Field of Classification Search .................. 66/231, 66/232, 237; 700/130, 131, 141
See application file for complete search history.

(56) References Cited

U.S. PATENT DOCUMENTS 6,880,367 B2 *   4/2005   Suzuki ..................... 66/232
7,058,471 B2 *   6/2006   Watanabe ................ 700/132
7,092,782 B2 *   8/2006   Lee ........................ 700/132
7,127,321 B2 *  10/2006   Kenji et al. .............. 700/141

FOREIGN PATENT DOCUMENTS

| JP | 9-212664 A | 8/1997 |
|----|------------|--------|
| JP | 2656405 B2 | 9/1997 |
| WO | WO 03/032203 A1 | 4/2003 |

OTHER PUBLICATIONS

Yamada et al., "Amimono Design o Shien suru tameno Amime Moyo Ikusei System no Sakusei", Transactions of Information Processing Society of Japan, Nov. 15, 1995, vol. 36, No. 11, pp. 2728-2735.

Ito et al., "3-jigen Himozukei Hyogen Hoho o Mochiita Amimono Pattern Shori ni Tsuite", Transactions on Information Processing Society of Japan, Feb. 15, 1996, vol. 37, No. 2, pp. 249-258.

(Continued)

*Primary Examiner*—Danny Worrell
(74) *Attorney, Agent, or Firm*—Rothwell, Figg, Ernst & Manbeck, P.C.

(57) ABSTRACT

A movement amount is determined for each of a plurality of stitches on a knitting fabric on the basis of relative positions between a stitch and stitches on the upper, lower, left, and right sides thereof in accordance with predetermined rules, and the stitch is moved. Movement of the stitch is repeated until the position of the stitch is converged. The stitch is then positioned at the converged value of the stitch position and displayed.

12 Claims, 9 Drawing Sheets

OTHER PUBLICATIONS

Demiroz et al., "A Study of Graphical Representation of Plain-knitted Structures Part I: Stitch Model for the Graphical Representation of Plain-knitted Structures", The Journal of The Textile Institute, vol. 91, 2000, No. 4.

Meisner et al., "The Art of Knitted Fabrics, Realistic & Physically Based Modelling of Knitted Patterns", Eurographics, '98, vol. 17, (1998), No. 3.

* cited by examiner

Prior Art

DEVICE, METHOD, AND PROGRAM FOR LOOP SIMULATION

CROSS REFERENCE TO RELATED APPLICATION

This application is a 35 USC § 371 National Phase Entry Application from PCT/JP2004/013107, filed Sep. 9, 2004, and designating the United States.

TECHNICAL FIELD

This invention relates to a device for performing a realistic loop simulation of a knitting fabric, as well as a loop simulation method and a loop simulation program.

BACKGROUND ART

The Art of Knitting Fabrics, Realistic & Physically Based Modelling of Knitted Patterns, EUROGRAPHICS '98, Vol. 17, (1998), Number 3 proposes that a knitting fabric be modeled using a model in which the stitches of the knitting fabric are replaced by particles, and the particles are connected to each other by spring forces. It is assumed that each particle moves in accordance with the Euler-Lagrange equation of motion, and a stable value of the position of each particle is determined by numerically solving this differential equation using the Runge-Kutta method. As an estimate of the calculation load generated by this method, when 2×2=4 stitches are represented by one particle in order to reduce the number of particles on a knitting fabric of 100 courses×100 wales, the calculation load is 2500 particles, and it is difficult to solve differential equations for these 2500 particles in succession. Moreover, when the calculation load is heavy, the number of elements which must be ignored to simplify the simulation model increases, making it difficult to perform a realistic simulation.

WO03/032203A1, which is a prior application of the inventor, discloses a method and device for increasing the ability to represent fluff on a yarn during a loop simulation. Also disclosed is a method for creating an image of a stitch by allocating a plurality of control points to a single stitch.

DISCLOSURE OF THE INVENTION

A primary object of this invention is to enable simulation of the positions of each stitch on a knitting fabric realistically and without the need to solve a differential equation.

A secondary object of this invention is to further simplify calculations for determining stitch positions.

A secondary object of this invention is to enable realistic representation of the manner in which upper and lower yarns overlap.

A secondary object of this invention is to determine realistically the movement amount of a stitch on a parallel plane to the knitting fabric.

In the invention, a loop simulation device determines an image of a knitting fabric corresponding to knitting fabric design data such that a loop of each stitch is represented. The device comprises: movement amount calculating means for determining a movement amount of the each stitch of the knitting fabric on the basis of relative positions between the each stitch and upper, lower, left, and right stitches in accordance with a predetermined rule; and convergence determining means for repeating processing performed by the movement amount calculating means until a position of the each stitch is converged on a converged value. The converged value is set as a stitch position.

In the following specification, in the absence of any indication to the contrary, description relating to the loop simulation device is applicable as is to a loop simulation method and a loop simulation program, and description relating to the loop simulation method and loop simulation program is applicable as is to the loop simulation device.

The movement amount calculating means preferably determines temporary movement amounts of each stitch in relation to each of the upper, lower, left, and right side stitches such that a distance between a subject stitch and the upper, lower, left, and right side stitches satisfies a predetermined rule, and preferably determines the movement amount by tabulating the temporary movement amounts determined in relation to each of the upper, lower, left, and right side stitches. When a plurality of upper or lower side stitches exist, weighting may be increased during tabulation in accordance with the number of stitches. Alternatively, a movement amount may be determined for each individual upper side and lower side stitch, or a movement amount may be determined for a virtual stitch obtained by averaging the individual movement amounts.

Further, the device preferably comprises means for determining an initial value of the position of the each stitch such that a distribution of the position of the each stitch does not deviate from a grid form. The processing of the movement amount calculating means preferably begins from the initial value. The initial value of the stitch position is determined either experientially or through calculation, for example, to be as close as possible to the converged position of the stitch.

Preferably, the position of the each stitch including a position in a parallel plane to the knitting fabric and a position in a perpendicular direction to the knitting fabric is determined. The movement amount calculating means preferably determines, for the each stitch, a movement amount (up to a yarn thickness, for example) in the perpendicular direction such that: the each stitch is not moved in the perpendicular direction when the each stitch is the same stitch type, a knit stitch or a purl stitch, as the stitch types of the upper, lower, left, and right stitches; and the each stitch is moved in the perpendicular direction when the each stitch is a different stitch type, a knit stitch or a purl stitch, from at least one of the stitch types of the upper, lower, left, and right stitches. Here, the movement amount based on the relationship with the left and right side stitches and the relationship with the upper and lower side stitches denotes a temporary movement amount in the left/right direction and up/down direction, and the actual movement amount in the up/down direction is obtained by tabulating the up/down/left/right temporary movement amounts.

Preferably, the position of the each stitch including a position in a parallel plane to the knitting fabric and a position in a perpendicular direction to the knitting fabric is determined, and a vertical size of the each stitch is determined. Preferably, the movement amount calculating means determines, for the each stitch, a movement amount of the each stitch in the parallel plane such that: when the each stitch is the same stitch type, a knit stitch or a purl stitch, as the stitch types of the upper and lower stitches, the vertical size of the each stitch corresponds to a distance between the upper and lower stitches in the parallel plane; and when the each stitch is a different stitch type, a knit stitch or a purl stitch, from at least one of the stitch types of the upper and lower stitches, the each stitch is moved in the perpendicular direction, whereby a knit stitch burrows beneath a purl stitch, and the distance between the upper and lower stitches in the parallel plane decreases below the vertical size in accordance with an amount of the each stitch movement in the perpendicular direction, for example such that the distance between the stitches in a three-dimensional space corresponds substantially to the vertical size.

Preferably, the position of the each stitch including a position in a parallel plane to the knitting fabric and a position in a perpendicular direction to the knitting fabric is determined, and a horizontal size of the each stitch is determined. The movement amount calculating means preferably determines, for the each stitch, a movement amount of the each stitch in the parallel plane to the knitting fabric such that: when the each stitch is the same stitch type, a knit stitch or a purl stitch, as the stitch types of the left and right stitches, the horizontal size of the each stitch corresponds to a distance between the left and right stitches in the parallel plane, and when the each stitch is a different stitch type, a knit stitch or a purl stitch, from at least one of the stitch types of the left and right stitches, the each stitch is moved in the perpendicular direction, up to the yarn thickness, for example, whereby a purl stitch burrows beneath a knit stitch, and the distance between the left and right stitches in the parallel plane decreases below the horizontal size of the each stitch in accordance with an amount of the each stitch movement in the perpendicular direction, for example such that the distance between the stitches in a three-dimensional space corresponds substantially to the horizontal size.

The stitch position is preferably expressed as a reference position, and the stitch position in at least a parallel plane to the knitting fabric is determined. An orientation of a vector extending from the reference position of the stitch to a reference position of the upper side stitch is preferably set as a stitch orientation. The movement amount calculating means preferably determines, for each stitch, the movement amount of a subject stitch within the parallel plane such that when the subject stitch has a different stitch orientation to the left and right side stitches, the stitch orientation of the subject stitch approximates the stitch orientation of the left and right side stitches, and a direction linking the reference position of the subject stitch to the reference positions of the left and right side stitches approximates a right-angled direction to the approximated orientation. The orientations are either aligned in a single processing cycle, or a proportion by which the aforementioned direction approximates a right-angled direction is determined appropriately.

When the movement amount in the parallel plane to the knitting fabric and the movement amount in the perpendicular direction to the knitting fabric are determined on the basis of the relationships with the upper, lower, left, and right side stitches, only the upper and lower side stitches of the subject stitch need be taken into consideration. Alternatively, only one of the upper and lower side stitches, i.e. only the upper side stitch of the subject stitch or only the lower side stitch of the subject stitch, need be taken into consideration. Likewise, the left and right side stitches of the subject stitch may be taken into consideration simultaneously, or only one of the left and right side stitches, i.e. only the left side stitch of the subject stitch or only the right side stitch of the subject stitch, may be taken into consideration. The vertical size and horizontal size of the stitches correspond to sizes in a three-dimensional space, for example, and may be constant regardless of the stitch type, or may be set as variables which vary according to the knitting conditions. The parallel plane to the knitting fabric may be referred to as the horizontal plane for convenience, and the movement amount in this direction may be referred to as a movement amount in the horizontal plane. The constitution whereby the movement amount in the parallel plane to the knitting fabric and the movement amount in the perpendicular direction to the knitting fabric are determined on the basis of the relationships with the upper and lower stitches or the left and right side stitches applies similarly to both the loop simulation method invention and the loop simulation program invention.

In the invention, a loop simulation method determines and displays an image of a knitting fabric corresponding to knitting fabric design data such that a loop of each stitch is represented. The method comprises the steps of: moving each stitch of the knitting fabric on the basis of relative positions between the each stitch and upper, lower, left, and right stitches in accordance with a predetermined rule; repeating the movement of the each stitch until a position of the each stitch is converged on a converged value; and displaying the each stitch arranged in the converged value being set as a stitch position.

Preferably, the method further comprises the steps of: determining the position of the each stitch including a position in a parallel plane to the knitting fabric and a position in a perpendicular direction to the knitting fabric; not moving the each stitch in the perpendicular direction to the knitting fabric when the each stitch is the same stitch type, a knit stitch or a purl stitch, as the stitch types of the upper, lower, left, and right stitches; and moving the each stitch in the perpendicular direction when the each stitch is a different stitch type, a knit stitch or a purl stitch, from at least one of the stitch types of the upper, lower, left, and right stitches.

In the invention, a loop simulation program determines and displays an image of a knitting fabric corresponding to knitting fabric design data such that a loop of each stitch is represented. The program comprises: a command for moving the each stitch of the knitting fabric on the basis of relative positions between the each stitch and upper, lower, left, and right stitches in accordance with a predetermined rule; a command for repeating the movement of the each stitch until a position of the each stitch is converged on a converged value; and a command for displaying the each stitch arranged in the converged value being set as a stitch position.

Preferably, the position of the each stitch including a position in a parallel plane to the knitting fabric and a position in a perpendicular direction to the knitting fabric is determined, and in the command for moving the each stitch, the each stitch is not moved in the perpendicular direction when the each stitch is the same stitch type, a knit stitch or a purl stitch, as the stitch types of the upper, lower, left, and right stitches, and the each stitch is moved in the perpendicular direction when the each stitch is a different stitch type, a knit stitch or a purl stitch, from at least one of the stitch types of the upper, lower, left, and right stitches.

In the loop simulation device, method, and program of this invention, the converged position (stable position) of the stitch can be determined without calculating the force that acts on the stitch or solving a differential equation expressing the motion of the stitch. To determine the position of a stitch in a single step, only the relationships (relative position and orientation) between the stitch and the stitches on the upper, lower, left, and right sides thereof are required, and hence processing is simple. The converged position of the stitch can be determined by repeating calculation of the movement amount. As shown in FIGS. 8 and 10, the knitting fabric can thus be simulated realistically.

The processing speed can be increased by determining four individual movement amounts based on the relationships to the upper, lower, left, and right side stitches, i.e. a movement amount based on the relationship to the upper side stitch, a movement amount based on the relationship to the lower side stitch, a movement amount based on the relationship to the right side stitch, and a movement amount based on the relationship to the left side stitch, and then determining a movement amount from an average by means of addition, multiplication, or the like, for example.

In this invention, calculation of the stable position of a stitch can be performed comparatively easily, and hence by modeling the stitch three-dimensionally and determining the movement amount thereof in a perpendicular direction to the knitting fabric based on its relationships with the upper, lower, left, and right side stitches, shadowing and overlapping of the stitch can be expressed realistically.

Further, when the upper and lower stitches differ in stitch type between a knit stitch and a purl stitch, the stitch is moved perpendicularly such that the knit stitch burrows beneath the purl stitch, and the distance therebetween on the parallel plane to the knitting fabric is reduced below the vertical size of the stitch in accordance with the difference in the stitch position in the perpendicular direction. As a result, the knit stitch burrows beneath the purl stitch such that the distance (the wale direction distance) between the upper and lower stitches on the parallel plane to the knitting fabric shrinks. Thus the simulation can be performed realistically.

Similarly, when the left and right side stitches differ in stitch type between a knit stitch and a purl stitch, the stitch is moved perpendicularly such that the purl stitch burrows beneath the knit stitch, and the distance therebetween on the parallel plane to the knitting fabric is reduced below the horizontal size of the stitch in accordance with the difference in the stitch position in the perpendicular direction. As a result, the purl stitch burrows beneath the knit stitch such that the distance (the course direction distance) between the left and right side stitches on the parallel plane to the knitting fabric shrinks. Thus the simulation can be performed realistically.

Furthermore, when the stitch orientation differs between the left and right side stitches, the orientations are made to approximate each other, and a line linking the reference positions of the left and right side stitches is made to approximate a right angle to the approximated orientations. In so doing, the interaction between stitches with respect to the stitch orientation can be simulated realistically.

According to an empirical rule, the knitting width of a ribbed knitting fabric shrinks below that of a plain knitting fabric. Furthermore, the stitch positions and so on in each knitting fabric type may be broadly predicted according to past simulation results and the like. Hence, a state in which the stitches have moved to a certain extent can be predicted from a model in which the stitches have a uniform size and do not overlap on the knitting fabric (in this case, the stitches are distributed in a grid pattern), and initial values of the stitch positions can be set accordingly. When these initial values are used, the number of times the movement amount must be calculated until the stitch positions are converged can be reduced, and hence the loop simulation can be performed at a higher speed.

Figure 1:
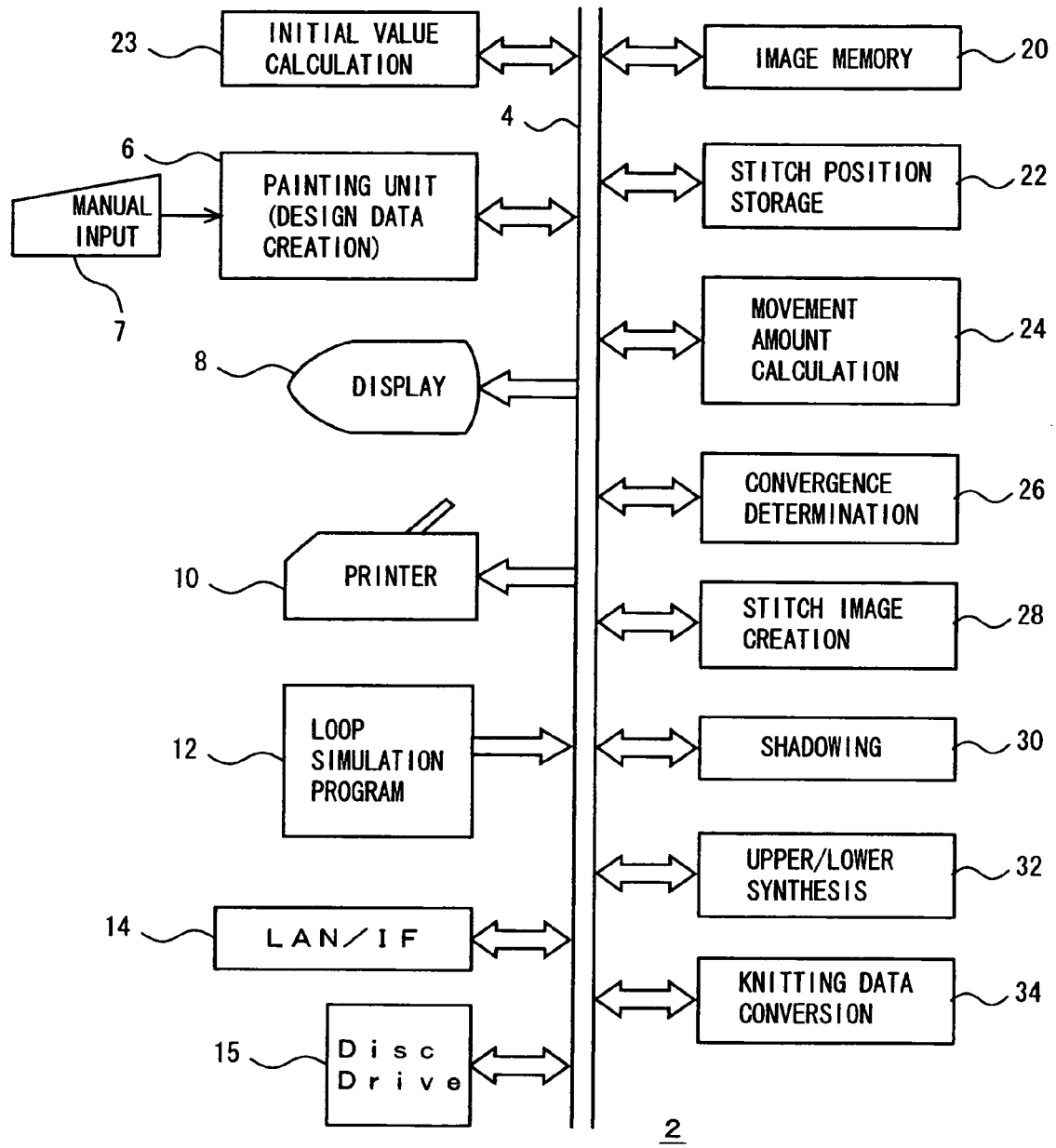
FIG. 1 is a block diagram of a loop simulation device according to an embodiment, and illustrates loop simulation relationship processing units a on the right side of a bus.

| BRIEF DESCRIPTION OF THE SYMBOLS | |
|---|---|
| 2 | loop simulation device |
| 4 | bus |
| 6 | painting unit |
| 7 | manual input |
| 8 | display unit |
| 10 | printer |
| 12 | loop simulation program storage unit |
| 14 | LAN interface |
| 15 | disk drive |
| 20 | image memory |
| 22 | stitch position storage unit |
| 23 | initial value calculation processing unit |
| 24 | movement amount calculation processing unit |
| 26 | convergence determination unit |
| 28 | stitch image creation unit |
| 30 | shadowing processing unit |
| 32 | upper/lower synthesis unit |
| 34 | knitting data conversion unit |
| 40 | loop simulation program |
| 41 | stitch position storage command |
| 42 | movement amount calculation command |
| 43 | convergence determination command |
| 44 | stitch image creation command |
| 45 | shadowing command |
| 46 | upper/lower synthesis command |
| 50 | plain knitting fabric |
| 51 | ribbed knitting fabric |

EMBODIMENT

Hereinafter, an embodiment in the most preferred form for carrying out the present invention will be described.

FIGS. 1 to 8 and so on illustrate an embodiment. In the drawings, 2 is a loop simulation device, 4 is a bus for transporting data, commands, and so on, 6 is a painting unit for inputting knitting fabric designs through manual input 7 using a stylus, a mouse, a track ball, or similar. 8 is a display unit for displaying design data, loop simulation images of the knitting fabric, and so on, and a printer 10 similarly outputs knitting fabric design data, loop simulation images, and so on. Note that a loop simulation image is an image simulated such that a virtual knitting fabric based on the design data of the knitting fabric is represented realistically by its individual loops (stitches). 12 is a loop simulation program storage unit for storing programs required for the loop simulation, and is shown in detail in FIG. 2. 14 is a LAN interface for inputting and outputting the knitting fabric loop simulation program, design data, knitting data based on the knitting fabric design data, loop simulation images, and so on to and from a LAN. A disk drive 15 inputs and outputs similar data to those input and output through the LAN interface 14 via a disk.

20 is an image memory in which images such as loop simulation images are stored in a raster format, for example. A stitch position storage unit 22 stores the position of each stitch on a virtual knitting fabric based on design data. Here, a coordinate system is determined in the following manner, for example. The knitting fabric is assumed to be placed on a horizontal table such that the course direction is an X direction and the wale direction is a Y direction, for example. The upper and lower sides of the Y direction correspond to the knitting end side and knitting start side respectively, for example. A perpendicular direction to the knitting fabric is set as a Z direction such that the Z coordinate increases toward the front side of the knitting fabric and decreases toward the rear side. Accordingly, the surface of the table on which the knitting fabric is virtually placed is assumed to be a surface having a Z coordinate of zero, for example.

The stitch position storage unit 22 stores the three-dimensional position of each stitch on the virtual knitting fabric. To simplify calculation, each stitch is provided with a reference position, and this position is assumed to be a base portion of the stitch, for example. However, the central portion of the needle loop or another location may be set as the reference position. Thus the XYZ coordinates of the reference position of each stitch are stored in the stitch position storage unit 22. Until an image of each individual stitch is created, the coordinates used for each stitch are the coordinates of the reference position, and therefore the reference position may occasionally be referred to simply as the position and the term "stitch" may be used to indicate the reference position of the stitch. Moreover, at the loop simulation stage, no actual knitting fabric exists, and therefore the term "knitting fabric" here denotes a virtual knitting fabric determined from design data. The term "stitch" is used to refer to a knitting stitch. The position of the stitch alters when a movement amount is calculated as described below, and therefore the position of each stitch at an appropriate time in the past may be stored in addition to the current stitch position. It is also possible to determine whether or not the position of the stitch has stopped moving following repeated calculation of the movement amount, or in other words whether or not the position of the stitch has converged.

23 is an initial value calculation processing unit for calculating an initial value of the stitch position in order to calculate the movement amount. When calculating the initial value, the shape of the knitting fabric is altered from design data in which the stitches share a common size and do not overlap on the basis of empirical rules such as the following: the course direction width of a ribbed knitting fabric, for example, is smaller than the course direction width of a plain knitting fabric having the same number of stitches, the shape of the knitting fabric changes in a cable pattern, and so on. At a connecting portion between a ribbed knitting fabric part and a plain knitting fabric part, etc., the course width of the connecting portion and so on are determined such that the knitting fabric width determined in relation to the ribbed knitting fabric and the knitting fabric width determined in relation to the plain knitting fabric connect smoothly. Once the shape of the knitting fabric has been determined, the initial value of the position of each stitch is determined in relation thereto. The initial stitch position values determined by the position calculation processing unit 23 are stored in the stitch position storage unit 22.

A movement amount calculation processing unit 24 calculates the movement amount of each stitch. During movement amount calculation, a movement amount based on the relationship of a stitch to the stitch thereabove is determined, and a movement amount based on the relationship of the stitch to the stitch therebelow is determined similarly. Movement amounts based on the relationship between the stitch and the stitch to the right side and the stitch to left side are also determined. These movement amounts are then averaged or tabulated to determine the movement amount. Here, the movement amount is determined in accordance with predetermined rules on the basis of the relative positions of a stitch to the stitches on the upper, lower, left, and right sides thereof, and not on the basis of a motion equation of the stitch, calculation of the yarn tension, and so on. Determining the movement amount on the basis of the positional relationship between a single stitch and the stitches on the upper, lower, left, and right sides thereof is simple, and performing processing one course at a time, for example, from a predetermined position on the knitting fabric is extremely easy. By repeating this processing a plurality of times, the stitch position converges. In other words, when the stitch stops moving following calculation of the movement amount, it is assumed that a stable stitch position has been obtained.

In so doing, the need to determine the position of a stitch by performing yarn tension calculations and so on is eliminated. There is also no need to determine the position of the stitch by simulating the motion of the stitch dynamically on the basis of the forces working between the stitches. As a result, the calculation load required for a loop simulation can be reduced, and correspondingly the number of elements that can be taken into consideration during the loop simulation can be increased, enabling an improvement in the expressiveness of the loop simulation. For example, assuming that a single stitch is constituted by three components, namely X, Y, and Z, and 10,000 stitches (100 courses×100 wales) exist, the number of variables is 30,000. When the movement amount is determined on the basis of the relationship between a subject stitch and its upper side stitch, all that needs to be taken into consideration are the three coordinates of the subject stitch and the three coordinates of the upper side stitch, and hence the movement amount based on the relationship between the subject stitch and its upper side stitch can be determined using a total of six coordinates. Movement amounts based on the relationship between a subject stitch and its lower side stitch and based on the relationship between a subject stitch and its left and right side stitches are determined in a similar manner. Thus, the movement amount of a single stitch can be determined through simple processing, and even with approximately 30,000 variables, processing can be performed in a comparatively short time. When performing processing from the bottom to the top of the wale direction (Y direction), for example, the upper side stitch of the subject stitch has not yet been moved, or in other words is in an inappropriate position. Since the relationship between the subject stitch and the inappropriately positioned stitch is also taken into account, the stitch position does not converge in a single processing cycle. Therefore, the processing must be repeated.

A convergence determination unit 26 determines whether or not the position of a stitch has stopped moving following calculation of the movement amount. For example, the position of a stitch obtained during the previous movement amount calculation and stored in the stitch position storage unit 22 is compared with the stitch position determined by the current movement amount calculation, and if the maximum or average difference between these positions is within a predetermined range, it is determined that the stitch position is stable. In addition, after movement amount calculation has been repeated 1,000 times or more, for example, movement amount calculation is halted and the immediately preceding stitch position, or a stitch position obtained at a time when the movement amount was comparatively small, is set as the final stitch position.

A stitch image creation unit 28 creates an image of a stitch using a loop simulation. Once the position of the stitch has been determined, the vertical size, horizontal size, and orientation of the stitch are determined according to the relative positions of the stitch with the upper side stitch and the left and right side stitches. A plurality of control points are determined in relation to the stitch, and the relative positions of each control point in relation to the reference position of the stitch are determined according to the vertical size, horizontal size, and orientation of the stitch. As a result, a stitch-form outline is determined. Once the stitch-form outline has been determined, plotting points are interpolated between each control point as needed. Subsequent processing corresponds to rendering processing, and therefore the control points are also considered as plotting points. Yarn is assumed to be constituted by a yarn main body and fluff on either side thereof, and hence images (known as meshes) constituted by a quadrilateral yarn main body and identical quadrilateral fluff on either side thereof are created with plotting points located on either end of the yarn main body mesh. The yarn main body and fluff are formed as a semi-transparent image, for example, and a value (a value indicating the transparency of the fluff, known as an a value) indicating the visibility of yarn on the lower side of the yarn main body and fluff parts is stored. When the image of the yarn main body and fluff is to be modified, the a value image is also modified. The thickness of the yarn main body and fluff is compressed in each mesh according to the gap with the adjacent yarn. Thus images of a yarn main body and fluff separated by two plotting points are prepared. When the images of the yarn main body and fluff are connected at the plotting points, a realistic stitch image of a single stitch is created.

A shadowing processing unit 30 determines the brightness of each plotting point and the brightness distribution (shadow) among the fluff and yarn main body meshes. The shadowing processing unit 30 stores a light source direction which may be modified through manual input or the like. A determination is then made as to whether or not other yarn main bodies, fluff, and the like exist between each plotting point and the light source. In this determination, X, Y, Z coordinates are applied to each plotting point, and hence the determination can be made easily. When a plotting point is in the shadow of another yarn mesh, its brightness decreases accordingly. The brightness distribution (shadow) at a mesh is also determined by determining diffused reflection light according to the light source direction, the orientation of the yarn at the plotting point, and so on.

In an upper/lower synthesis unit 32, synthesis is performed in positions where a plurality of stitches overlap on the upper and lower sides such that a lower side yarn mesh appears on the lower side of an upper side yarn mesh. In this processing, mesh images on the side having a high Z value (the front side of the knitting fabric) are used as is, whereas mesh images on the side having a low Z value are made visible in a proportion determined by the α value of the upper side mesh image. Thus the upper and lower images are synthesized.

34 is a knitting data conversion unit for converting knitting fabric design data designed by the painting unit 6 into knitting data for a knitting machine. The conversion that is performed here may, but need not, take individual knitting machine types into account. The data which form the basis of the loop simulation are constituted by design data created by the painting unit 6 which are converted so as to describe the type of the subject stitch, the type of the upper, lower, left, and right side stitches, and the connection relationships therebetween. Note that the stitch type includes knit stitch/purl stitch, and the connection relationship includes the number and positions of stitches (parent stitches) latching a subject needle loop, and the number, positions, and so on of stitches (child stitches) latching the needle loop at the base portion of the subject stitch. When the gauge is otherwise modified during knitting, the gauge of each stitch and so on is also used in the loop simulation such that small-gauge stitches are increased in size.

Figure 2:
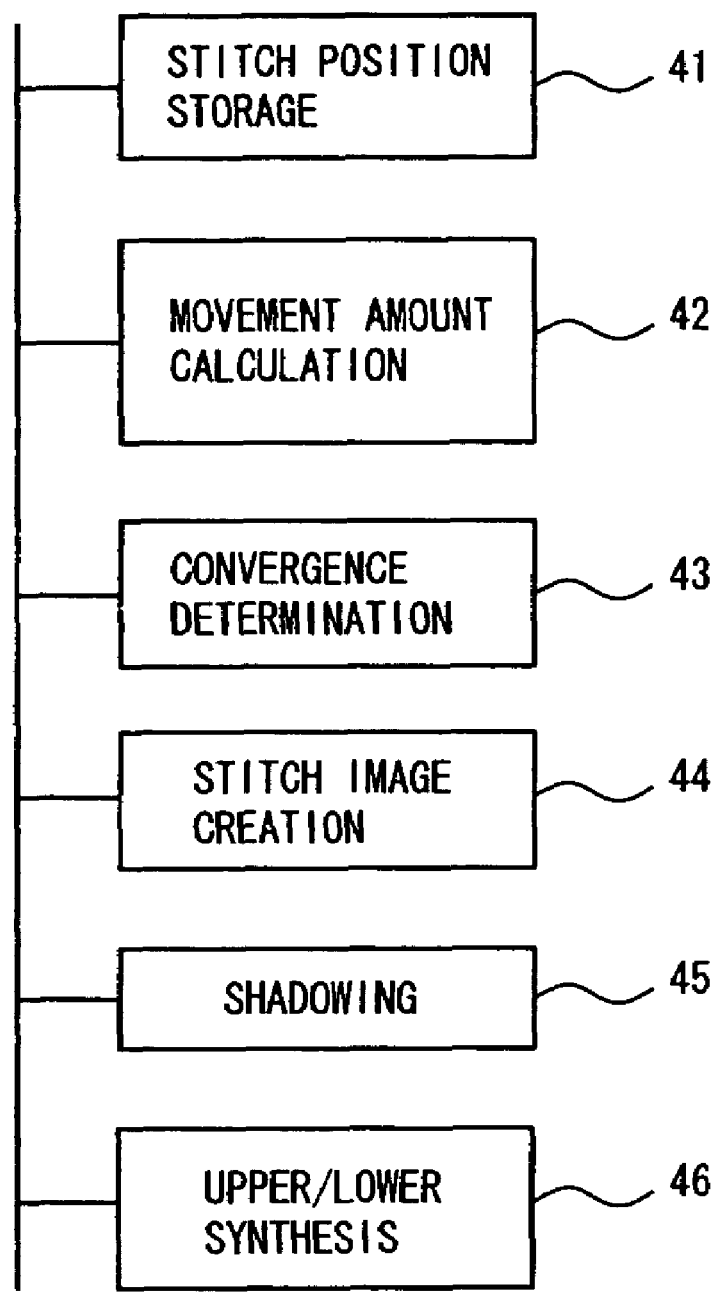
FIG. 2 is a schematic diagram of a loop simulation program according to this embodiment.

FIG. 2 shows an example of a loop simulation program 40. A stitch position storage command 41 stores a command required for the processing performed by the stitch position storage unit 22, a movement amount calculation command 42 stores a command for performing the required processing of the movement amount calculation processing unit 24, and a convergence determination command 43 stores a command required for the convergence determination unit 26 to perform a convergence determination. A stitch image creation command 44 stores a command required for the stitch image creation unit 28 to create a stitch image, a shadowing command 45 stores a command required for the shadowing processing unit 30 to perform shadowing on the stitch image, and a upper/lower synthesis command 46 stores a command required for the upper/lower synthesis unit 32 to synthesize upper and lower stitch images.

Figure 3:
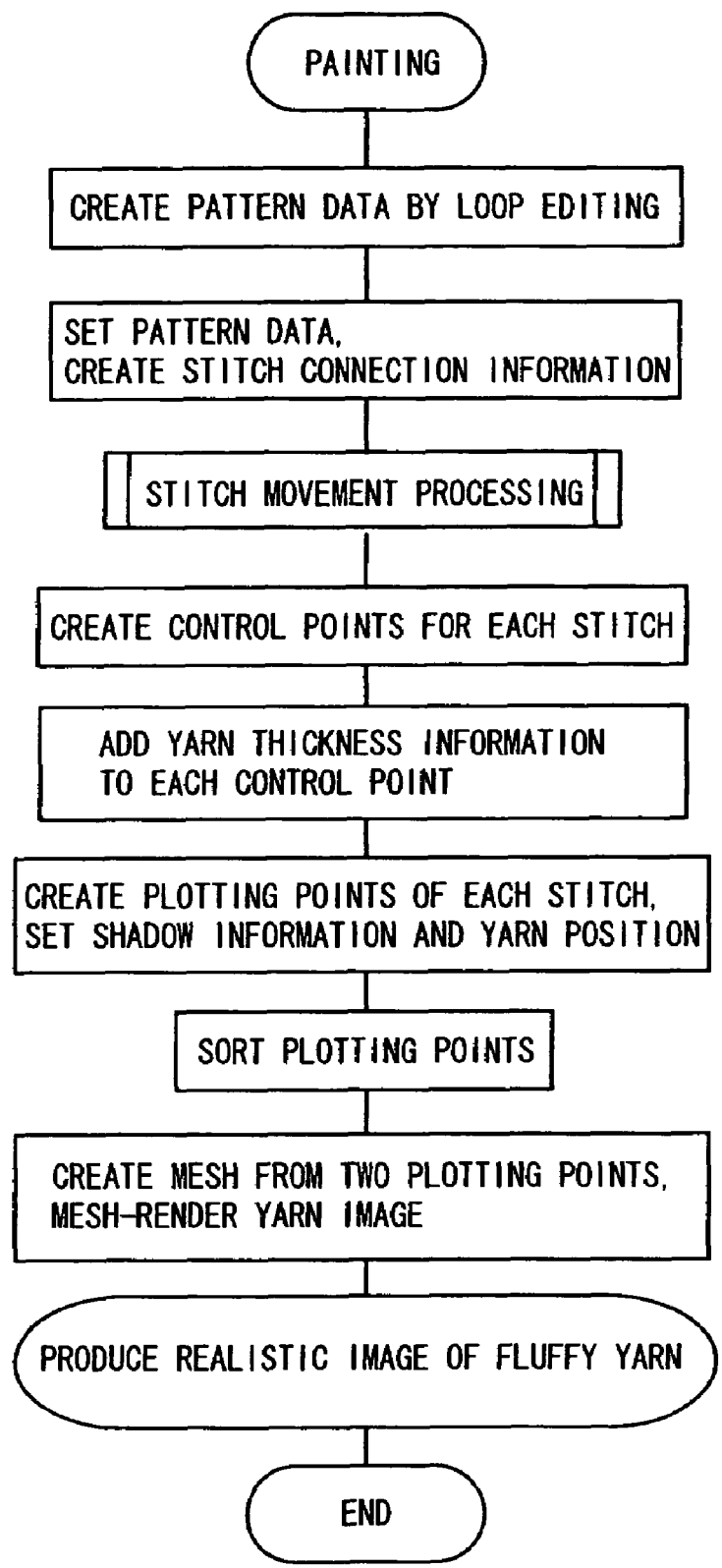
FIG. 3 is a schematic flowchart illustrating a loop simulation method according to this embodiment.

FIG. 3 shows an outline of a loop simulation algorithm. Knitting fabric pattern data are input manually into the painting unit, and here, for the convenience of the designer, the pattern data may be input while the stitch loops are displayed on the display unit. Once the pattern data are set (fixed), connection information indicating the connections between each stitch is created, whereupon the process advances to stitch movement processing. Once stitch movement processing is complete, control points are created in relation to each stitch, and yarn thickness information is added to the control points. In other words, the thickness of the fluff and yarn main body is compressed in accordance with the gap between adjacent yarns, plotting points are created to interpolate the gap between control points, and shadow information (brightness distribution) and the yarn positions (the positions of the plotting points) are set.

Overlapping plotting points in a perpendicular direction to the knitting fabric are then processed by sorting upper and lower plotting points from the upper side (the front side of the knitting fabric) to the lower side (the interior and bottom side of the knitting fabric), for example, such that the upper and lower sides are synthesized. A yarn main body mesh and fluff meshes on either side thereof are then created to connect two plotting points, and a stitch image is rendered by connecting the meshes. Once a stitch image using fluffy yarn has been obtained in this manner, the image is used to represent each stitch, and a loop simulation is performed.

Figure 4:
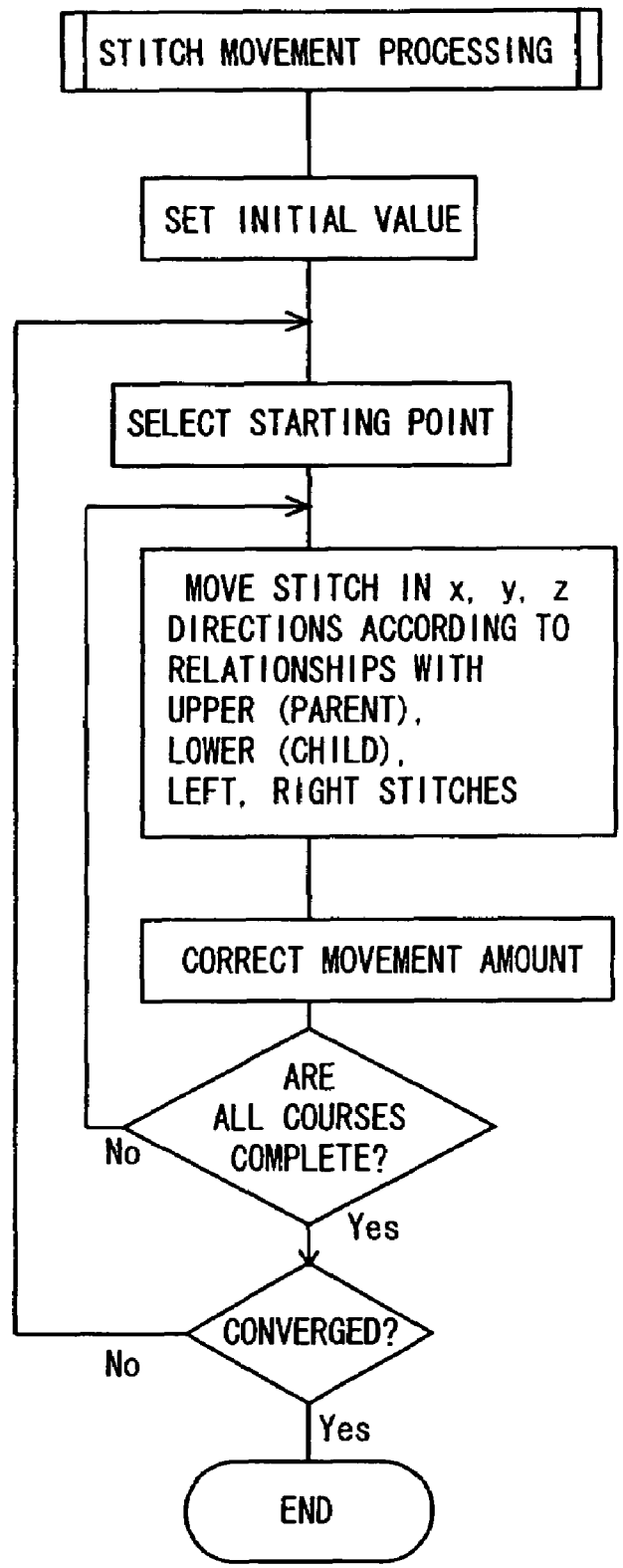
FIG. 4 is a flowchart illustrating an algorithm of the stitch movement processing of FIG. 3.
Figure 7:
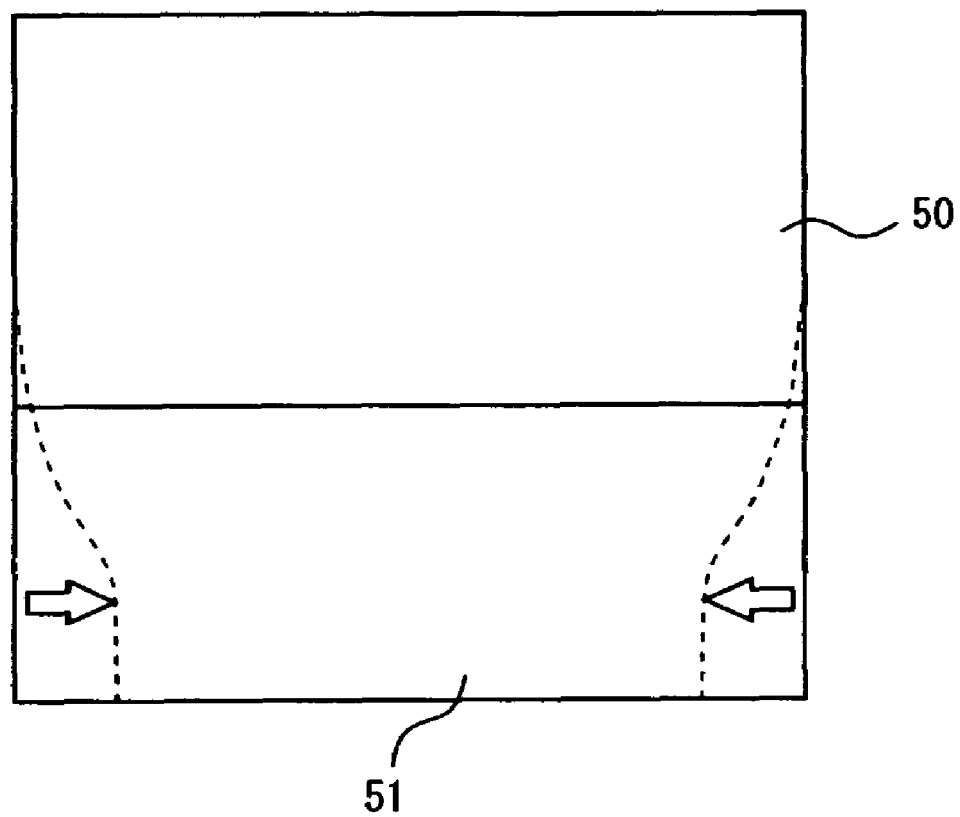
FIG. 7 is a view showing an example of stitch movement processing using an initial value of the stitch position which takes into account shrinkage of a ribbed knitting fabric in the course direction.

FIG. 4 illustrates stitch movement processing. To reduce the number of movement amount calculations, an initial value of the knitting fabric shape is set. For example, FIG. 7 shows a knitting fabric constituted by a plain knitting fabric 50 and a ribbed knitting fabric 51. The number of stitches in the course direction is the same, but in the ribbed knitting fabric, the purl stitches tend to burrow under the knit stitches, and therefore the knitting width decreases. To illustrate this decrease in the knitting width of the ribbed knitting fabric, the outer form of the knitting fabric is modified from the solid line to the broken line. The initial value of each stitch position is then determined in accordance with the outer form of the knitting fabric.

A stitch movement starting point is selected, the default value thereof being the stitch in the lower left corner of the knitting fabric, for example. Next, the X, Y, Z direction movement amount of each stitch is determined in accordance with the relationships with the stitches on the upper, lower, left, and right sides. To prevent illogical movement amounts, the movement amount range is provided with a limitation, and movement amounts exceeding the limitation are corrected. In this manner, all of the courses are processed one at a time from bottom to top, for example, and a convergence determination is made every time the movement amount of all of the stitches is determined. When convergence is achieved, the processing ends.

Figure 5:
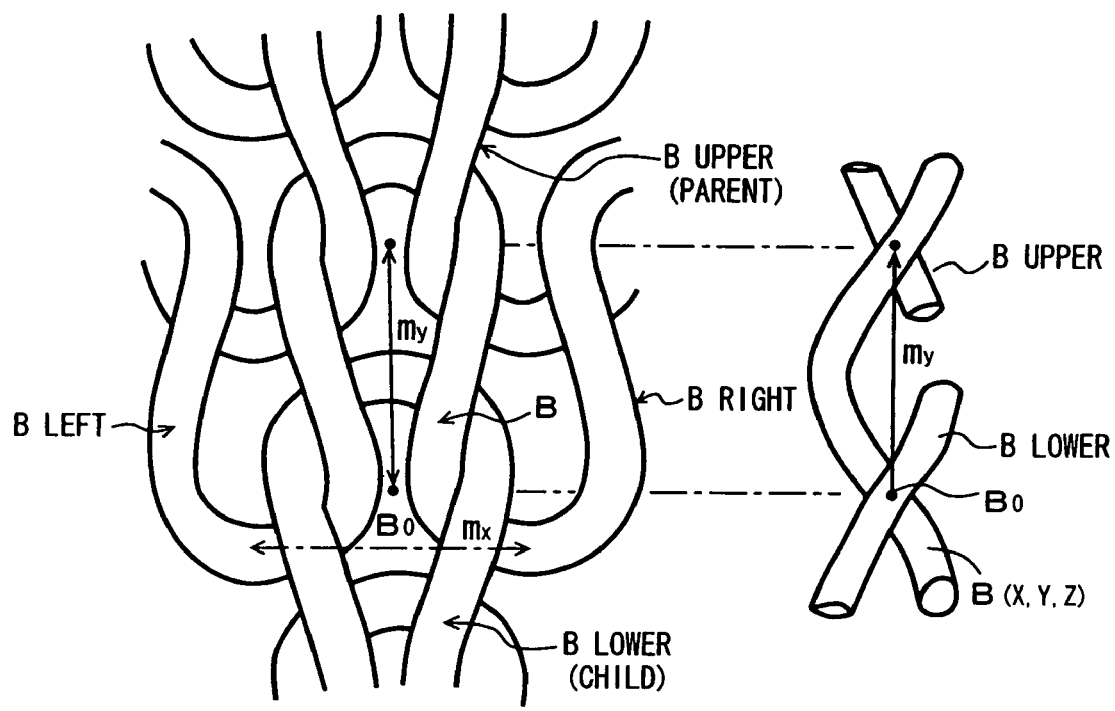
FIG. 5 is a view showing a stitch model used in this embodiment, wherein the left side shows the relationship between upper (parent), lower (child), left, and right stitches, the right side shows a cross-section in a perpendicular direction (Z direction) to the knitting fabric, each stitch B has (X, Y, Z) three-dimensional coordinates, my denotes the vertical size of the stitch (knitting stitch), and mx shows the horizontal size of the stitch.

FIG. 5 shows a model of a stitch used during movement amount calculation. A point B0 at the base end portion of a central stitch B serves as the reference position of the stitch, the distance from the reference position B0 to the base end portion of the upper stitch serves as the vertical direction size my of the stitch, and the horizontal width mx of the stitch is also determined as shown in FIG. 5. As shown in FIG. 5, the upper side stitch and the lower side stitch are determined, the upper side stitch being referred to as a parent and the lower side stitch being referred to as a child. The right side stitch and left side stitch are determined similarly. As shown on the right side of FIG. 5, the size my is a distance within a three-dimensional space and the size mx is also a distance within a three-dimensional space. However, the sizes my, mx may be considered as distances in an XY plane in order to simplify processing.

General rules adhered to when performing stitch movement processing are described in the following "Rule List; General Rules". Further, during stitch movement, stitches are assumed to exist virtually in unselected needle positions (miss), and therefore the rules of "Rule List; Unselected Needle Stitches" are applied. The movement amount of a knit stitch or a purl stitch in the XY plane is determined in accordance with a rule list. Furthermore, the movement amount of a knit stitch or a purl stitch in the Z direction is determined in accordance with a "Rule List; Knit Stitch or Purl Stitch". Further, in accordance with a "Rule List; Movement Amount Limitation", the position of a subject stitch following movement is corrected when in an unnatural position in relation to the surrounding stitches.

Rule List; General Rules
  Definitions
  The Z direction is perpendicular to the surface of the knitting fabric, and it is assumed that stitches also exist virtually in unselected needle positions in the height direction when the knitting fabric is placed horizontally.
  A parent is a stitch (upper stitch) whose sinker loop is latched.
  A child is an opposite lower stitch.
  When expressing distance and position, the terms "the reference position of the stitch", "the position of the stitch", and "the stitch" are synonymous.
  The movement amount is calculated in relation to each of the parent/child/left/right stitches, and the average thereof is used as the movement amount.
  For ease of description, new coordinates are determined for a subject stitch in relation to each of the parent/child/left/right stitches, and the average thereof is used as the new coordinates of the subject stitch.
  The stitch orientation is defined as the orientation in which the child stitch position and parent stitch position are linked, and is expressed in principle as an inclination from the y axis.
  The vertical size my and horizontal size mx of a stitch are both constants, while the yarn thickness during stitch movement processing, which is a size within a three-dimensional space, is a freely settable constant, for example an approximation of the diameter of the yarn main body.
  Exception
  In the case of a stitch not having one of an upper/lower/left/right stitch, only the influence of the stitches existing on the upper/lower/left/right sides is taken into account.

Rule List; Unselected Needle Stitches
  Horizontal Direction
  Left/right movement is performed to eliminate the horizontal width of the stitch.
  Z Direction
  When the adjacent stitch is also an unselected needle stitch: identical height is assumed.
  When the adjacent stitch is a knit stitch: height of the reference position of the adjacent stitch−predetermined value.
  When the adjacent stitch is a purl stitch: height of the reference position of the adjacent stitch+predetermined value.

Rule List; Knit Stitches or Purl Stitches (in XY Plane)
  Horizontal Direction
  Parent Stitch
  The distance to the position of the parent stitch serves as the vertical size my of the subject stitch, and the orientation of the subject stitch is set to be parallel to a line linking the subject stitch position to the parent stitch position. Alternatively, the parent stitch above the parent stitch of the subject stitch may be used as a reference.
  When a plurality of parent stitches exist, a central point of the positions of the plurality of parent stitches may be set as the position of a virtual single parent stitch.
  During knit/purl variation, knit stitches are caused to burrow under purl stitches by a predetermined distance (up to the thickness of the yarn) in accordance with the Z position.
  When a plurality of parent stitches exist, the movement amount is determined in relation to each parent stitch. However, only the movement amount in relation to the nearest parent stitch need be determined.

Child Stitch

The distance to the position of the child stitch serves as the vertical size my of the subject stitch, and the orientation of the subject stitch is set to be parallel to a line linking the child stitch position to the parent stitch position.

When a plurality of child stitches exist, the movement amount is determined in relation to each child stitch. However, during knit/purl variation, the horizontal direction movement amount is determined such that knit stitches are caused to burrow under purl stitches by a predetermined distance (up to the thickness of the yarn) in accordance with the Z position.

Left/Right Stitches

The gap between the subject stitch and the left/right stitches is set as the horizontal size mx of the subject stitch. However, during knit/purl variation, purl stitches are caused to burrow under knit stitches by a predetermined distance (up to the thickness of the yarn) in accordance with the Z position.

Stitch Orientation (Inclination from Y Direction)

When the stitch orientation differs from those of the left and right side stitches, the orientation is aligned through movement to a side on which the stitches line up horizontally (a side on which the direction linking the reference positions of the left and right side stitches is right-angled to the direction of the stitch). A movement amount enabling alignment of the orientations in a single movement or enabling horizontal alignment of the stitches is determined appropriately, and differences in orientation and deviation in the stitch positions from horizontal alignment are reduced in comparison with the state prior to processing, for example.

Rule List; Knit Stitches or Purl Stitches (Z Direction)

Z Direction

When knit stitches or purl stitches extend continuously in the parent/child direction (wale direction), the Z coordinate of the subject stitch is brought closer to the Z coordinate of the parent stitch.

When the parent and subject differ in stitch type such that the parent is a purl stitch and the subject is a knit stitch, the Z coordinate of the subject is made smaller than the parent by the yarn thickness.

When the parent is a knit stitch and the subject is a purl stitch, the Z coordinate of the subject is made larger than the parent by the yarn thickness.

Left/Right Stitches

When adjacent stitches are of the same stitch type (knit/knit or purl/purl), the Z coordinates are aligned.

When adjacent stitches are of different types (knit/purl) and the subject is a knit stitch, the Z coordinate is increased by the yarn thickness. When the subject is a purl stitch, the Z coordinate is decreased by the yarn thickness.

When the child and subject differ in stitch type such that the child is a knit stitch and the subject is a purl stitch, the Z coordinate of the subject is made larger than the child by the yarn thickness.

When the child is a purl stitch and the subject is a knit stitch, the Z coordinate of the subject is made smaller than the child by the yarn thickness.

Rule List; Movement Amount Limitation

When a parent stitch or child stitch is in an unnatural position, the stitch is corrected according to the following standards.

The Y coordinate does not exceed the Y coordinate of the parent stitch and does not fall below the Y coordinate of the child stitch.

The movement amount of the subject stitch may also be limited to a predetermined number of times the movement amount of the parent stitch or the movement amount of the child stitch.

In the case of crossing or the like, the Z values of the upper and lower stitches may be differentiated.

Figure 6:
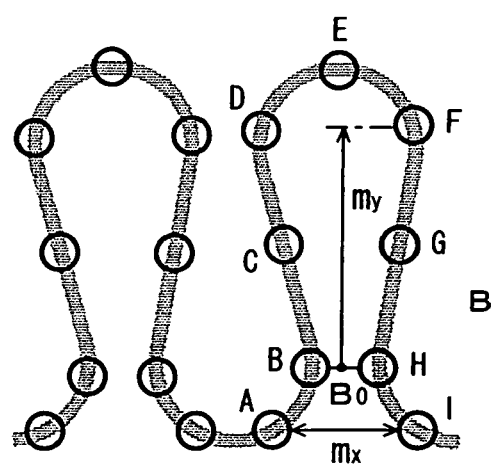
FIG. 6 is a view illustrating the control points of a stitch used in this embodiment, wherein a midpoint of a control point BH is a reference point of the stitch denoting the stitch position. The positions of each control point A through I are expressed by displacement from the reference point, and the displacement is determined by multiplying a constant for determining the position of each control point by the vertical size my and horizontal size mx of the stitch. When the orientation of the stitch is inclined from a Y axis, the displacement is rotated in accordance with the inclination.

When stitch movement processing is complete, the control points are calculated. An example of the control points is shown in FIG. 6. For example, nine control points A to I are determined for a single stitch, and if necessary, plotting points are provided to interpolate each control point. During rendering, the control points are also regarded as plotting points. Since the position of each stitch has been determined, the vertical size, horizontal size, and orientation of each stitch are also determined. The coordinates of each control point A to I are determined by mapping the loop form shown in FIG. 6 in relation to the form determined in this manner.

Control Point Calculation

Horizontal Size

Taking into account the orientation of the subject stitch and the coordinate system at a right angle thereto, the distance to the adjacent stitch along a right-angled coordinate axis to the orientation of the stitch is determined, and the left/right average of this distance is set as the horizontal size of the stitch.

Vertical Size

The distance to the parent stitch is set as the vertical size.

Control Points

The pre-stored stitch model is modified using information such as the vertical size and horizontal size, and the orientation of the stitches above and below the subject stitch.

XY Coordinate

When the stitch model has no child, the lower side is widened.

Z Coordinate

The Z coordinate of the reference position is corrected in accordance with the stitch type of the parent stitch and the positions of the control points.

When a plurality of children exist in relation to a parent, the Z coordinate is corrected depending on whether the subject is above or below.

When no lower stitch exists, the part that can be lifted up by the needle loop of the lower stitch is corrected to the lower side.

For example, the relative positions from a reference point B0 are set such that the vertical size is my and the horizontal size is mx, and thus the X coordinate of the control point A is $-0.35$ mx, and the Y coordinate is $-0.26$ my. At the control point B, the X coordinate is $-0.14$ mx and the Y coordinate is 0. At the control point C, the X coordinate is $-0.25$ mx and the Y coordinate is $-0.55$ my, and at the control point D, the X coordinate is $-0.36$ mx and the Y coordinate is $-1.10$ my. Furthermore, at the control point E, the X coordinate is 0 and the Y coordinate is 1.40 my. The coordinates of the control points F to I correspond to the coordinates of the control points D to A left-right reversed about the vertical direction vector my in FIG. 6. When the orientation of the stitch differs from the up/down direction of the knitting fabric, the control points A to I are rotated about the reference position of the stitch by the orientation of the stitch. The Z coordinate is modified from the reference position B0 in relation to each control point A to I, taking into consideration the relationships with the upper side stitch and the left and right side stitches. For example, when the subject is a knit stitch and the parent is also a knit stitch, the Z coordinate of the control points A, E, I is reduced while the Z coordinate of the control points C, G is increased. When a plurality of stitches are latched to a single parent stitch, a determination is made from the design data as to whether the subject is on the upper side or the lower side of the other stitches latched to the same parent, and the Z coordinate of each control point is modified to reflect the determination result. The Z coordinate of the control points A, I is also controlled taking the left and right side stitches into account to ensure that no unnatural values are obtained. Thus the three-dimensional coordinates of the control points A to I are determined.

Once the three-dimensional coordinates of each control point have been determined, the yarn thickness is calculated. The yarn is constituted by a yarn main body having a slight compressibility, and compressible fluff on the periphery thereof, for example, and hence the fluff and yarn main body are compressed in accordance with the gap between a yarn and the adjacent yarn. The brightness of each plotting point is then set according to whether or not other yarns exist between the plotting point and the light source, whereupon the diffused reflection light is calculated according to the inclination of the yarn in the vicinity of the plotting points and so on to determine the brightness distribution in relation to the yarn main body and fluff. Assuming that a quadrilateral yarn main body mesh is formed between two plotting points and quadrilateral fluff meshes are formed similarly on either side of the yarn main body mesh, the meshes are connected, whereby the brightness is set. The upper and lower yarn images are then synthesized, taking into consideration the state of upper/lower overlap of the yarn, and a loop simulation is performed.

Stitch Image
 Yarn Model
 The yarn is assumed to be constituted by a yarn main body and fluff above and below the yarn main body.
 The gap between each control point and the adjacent yarn is determined, and the fluff and yarn main body are compressed in accordance with the determined gap.
 Overlap of Upper and Lower Yarns
 The lower side yarn can be seen through gaps in the fluff, and hence the upper and lower yarns are represented.
 Plotting Points
 Plotting points are interpolated between two control points.
 A quadrilateral yarn main body and similar quadrilateral fluff on either side of the yarn main body are rendered for each plotting point, whereupon each plotting point (mesh) is connected.
 Shadowing
 A light source direction is presumed, and shadowing (shadows within the meshes) is determined by an appropriate model, assuming that the cross-section of the yarn is circular and taking into consideration diffused reflection light.
 A determination is also made in relation to each plotting point as to whether shadows enter another control point (or plotting point), and the basic brightness (mesh brightness) of the plotting point is set.

Figure 8:
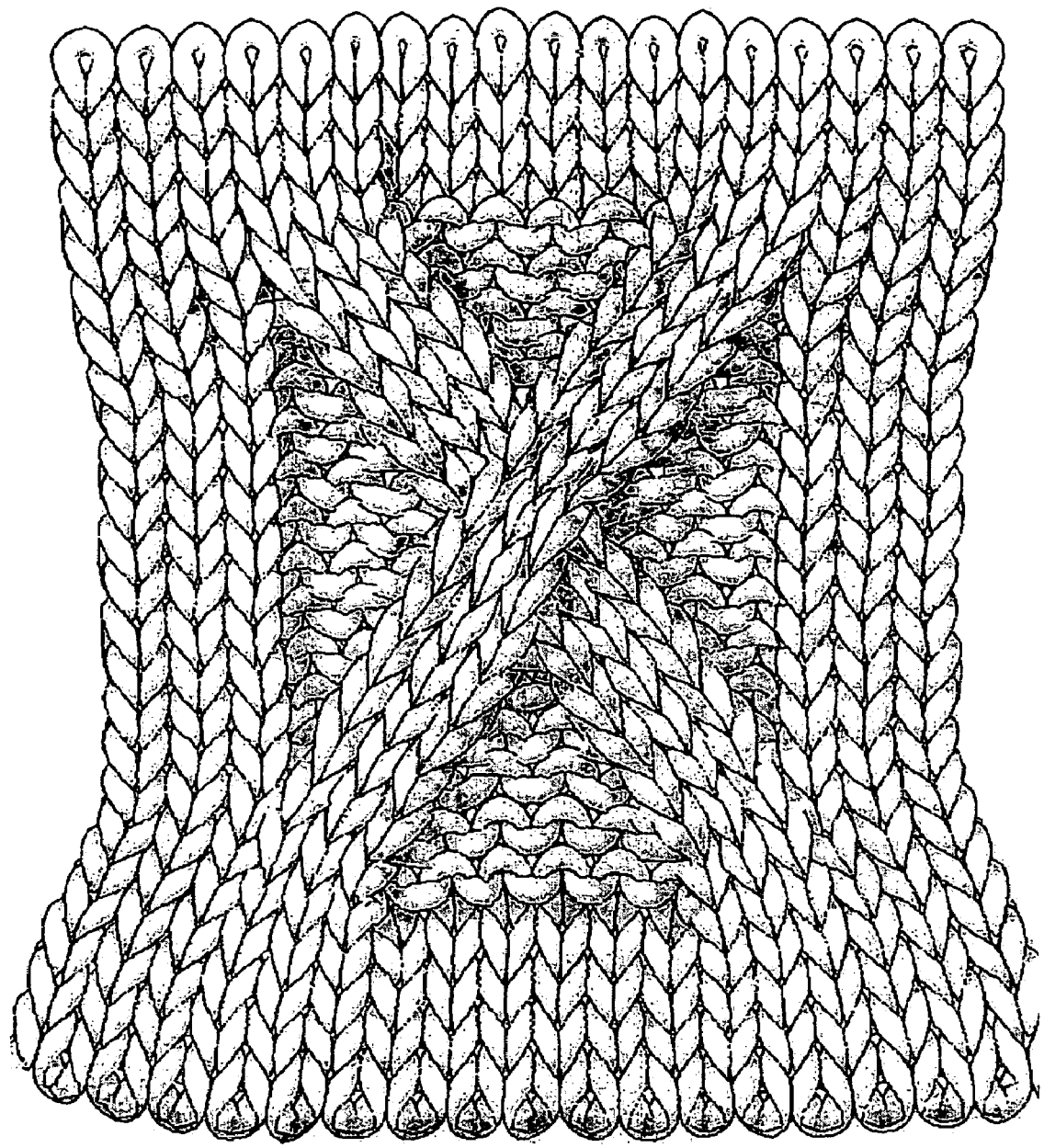
FIG. 8 is a view showing a loop simulation image according to this embodiment.
Figure 9:
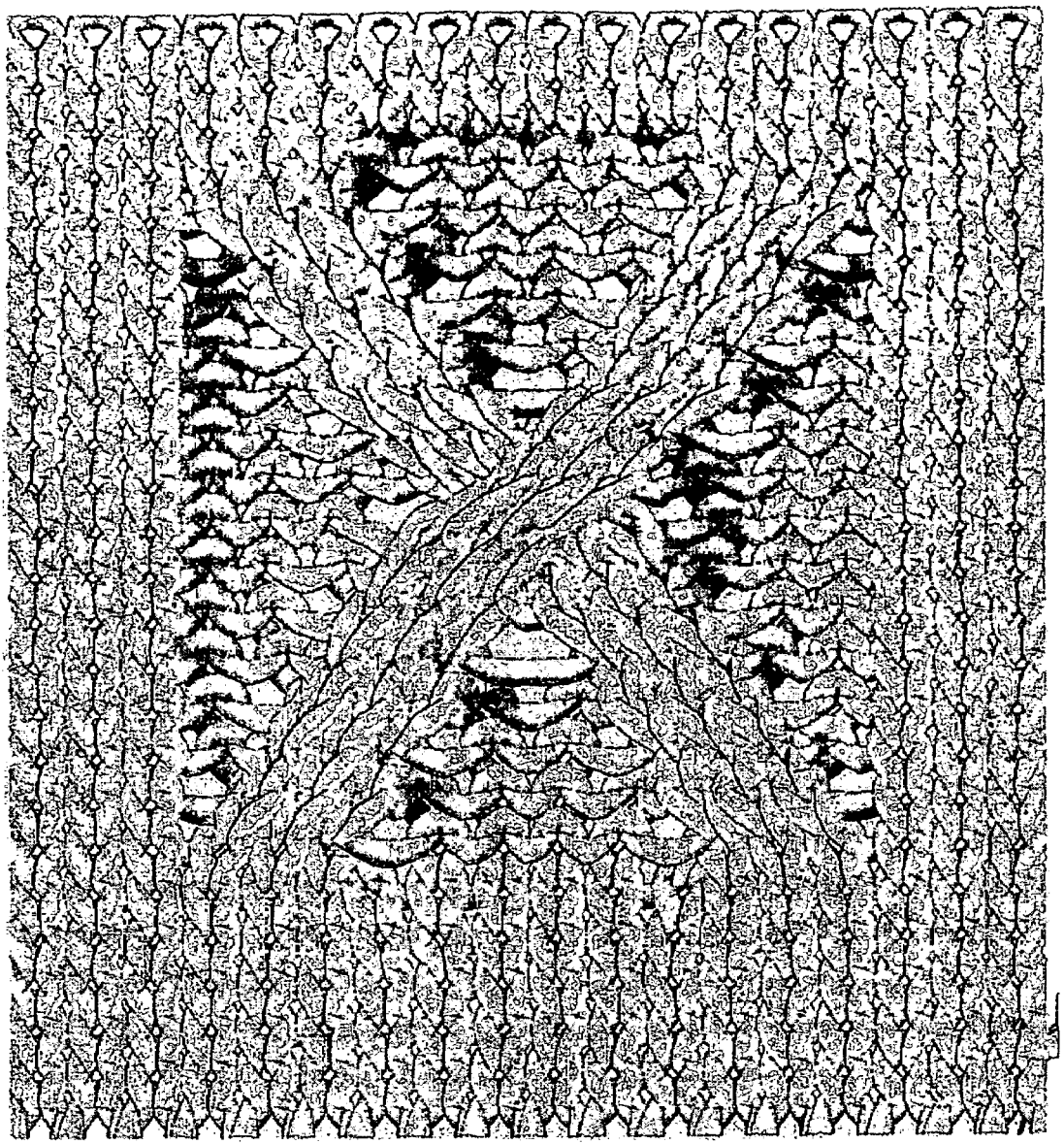
FIG. 9 is a view showing a loop simulation image according to a conventional example.

FIGS. 8 and 9 show cable pattern knitting fabrics. FIG. 9 shows a conventional example of a loop simulation image (with no stitch movement), and FIG. 8 shows a loop simulation image according to this embodiment. In the conventional example, the stitch width is unnaturally large on the X periphery of the cable, for example, whereas this embodiment differs in that the peripheral plain knit part is naturally compressed. Moreover, the stitch orientation has been altered on the X periphery of the cable so as to align with the cable part. In this embodiment, dynamic calculations such as motion equations and calculations to determine the tension of the yarn need not be performed, and instead a simulation is performed according to experiential rules corresponding to the relationships with the upper, lower, left, and right side stitches. The simulation generates extremely natural results.

Figure 10:
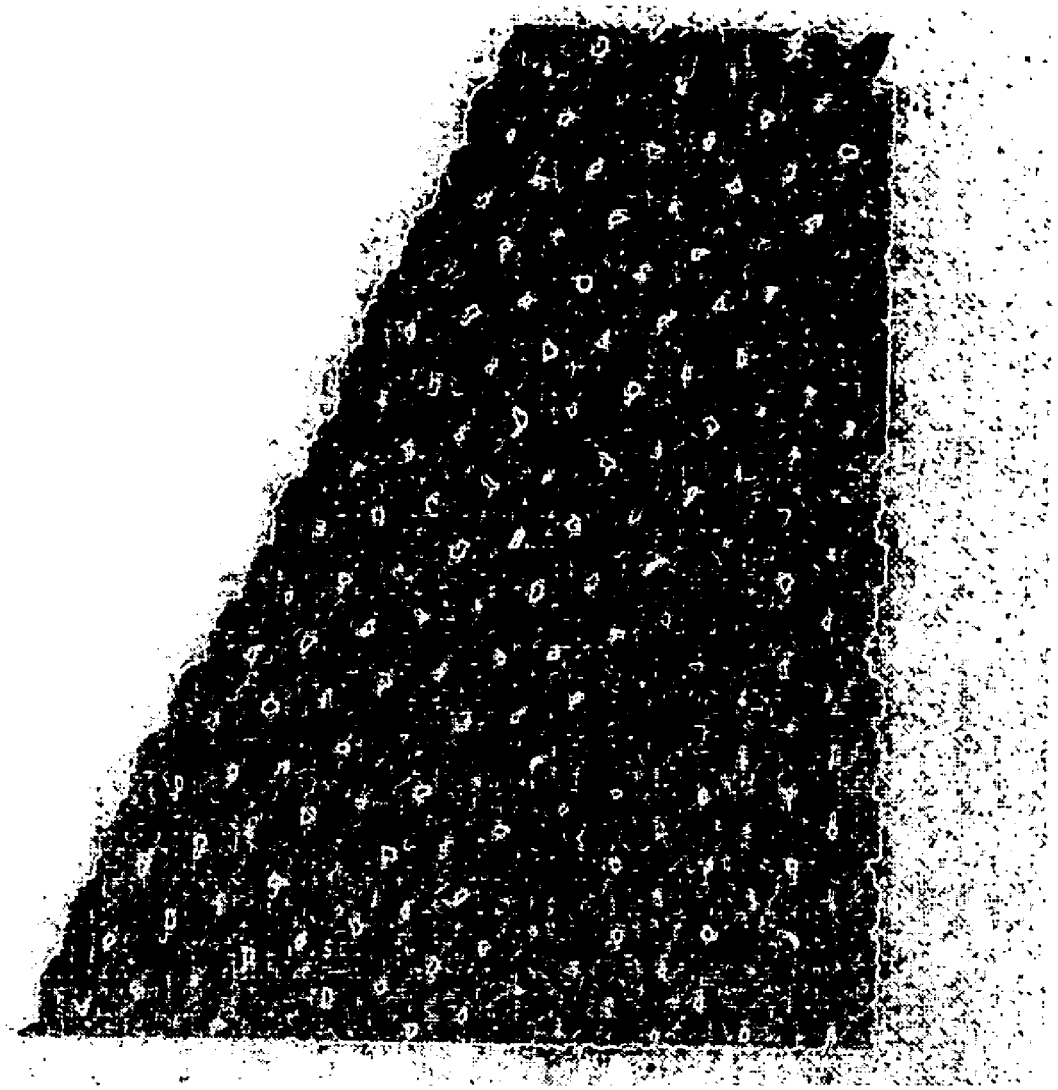
FIG. 10 is a view showing a loop simulation image in a stitch movement portion of this embodiment.

FIG. 10 shows a loop simulation image of a stitch movement (inside decrease) part of this embodiment. The lines on which modification and decrease of the wale direction are produced by the stitch movement are represented realistically. The stitch orientation and wale direction are altered realistically at the stitch movement parts.

The invention claimed is:

1. A loop simulation device for determining an image of a knitting fabric corresponding to knitting fabric design data such that a loop of each stitch is represented, the device comprising:
 movement amount calculating means for determining a movement amount of the each stitch of the knitting fabric such that distances between the each stitch and upper, lower, left, and right stitches satisfy a predetermined rule and a stitch orientation of the each stitch approximates stitch orientations of left and right stitches when the stitch orientation of the each stitch differs from the stitch orientations of the left and right stitches;
 convergence determining means for repeating processing performed by said movement amount calculating means until a position of the each stitch is converged on a converged value, the converged value being set as a stitch position;
 stitch position storage means for storing data for said stitch position and said stitch orientation;
 memory for storing the knitting fabric design data; and
 display means for displaying the image of the knitted fabric.

2. The loop simulation device of claim 1, characterized in that said movement amount calculating means further determines the movement amount of the each stitch such that an angle between the stitch orientation of the each stitch and a direction linking the each stitch to the left and right stitches approximates a right angle.

3. The loop simulation device of claim 1, characterized in that the position of the each stitch including a position in a parallel plane to the knitting fabric and a position in a perpendicular direction to the knitting fabric is determined, and
 said movement amount calculating means determines, for the each stitch, a movement amount in said perpendicular direction such that:
 the each stitch is not moved in said perpendicular direction when the each stitch is the same stitch type, a knit stitch or a purl stitch, as the stitch types of the upper, lower, left, and right stitches; and
 the each stitch is moved in said perpendicular direction when the each stitch is a different stitch type, a knit stitch or a purl stitch, from at least one of the stitch types of the upper, lower, left, and right stitches.

4. The loop simulation device of claim 1, characterized in that the position of the each stitch including a position in a parallel plane to the knitting fabric and a position in a perpendicular direction to the knitting fabric is determined, and a vertical size of the each stitch is determined, and that
 said movement amount calculating means determines, for the each stitch, a movement amount of the each stitch in said parallel plane such that:

when the each stitch is the same stitch type, a knit stitch or a purl stitch, as the stitch types of the upper and lower stitches, the vertical size of the each stitch corresponds to a distance between the upper and lower stitches in said parallel plane; and when the each stitch is a different stitch type, a knit stitch or a purl stitch, from at least one of the stitch types of the upper and lower stitches, the each stitch is moved in said perpendicular direction, whereby a knit stitch burrows beneath a purl stitch, and the distance between the upper and lower stitches in said parallel plane decreases below said vertical size in accordance with an amount of the each stitch movement in said perpendicular direction.

5. The loop simulation device of claim 1, characterized in that the position of the each stitch including a position in a parallel plane to the knitting fabric and a position in a perpendicular direction to the knitting fabric is determined, and a horizontal size of the each stitch is determined, and said movement amount calculating means determines, for the each stitch, a movement amount of the each stitch in the parallel plane to the knitting fabric such that:

when the each stitch is the same stitch type, a knit stitch or a purl stitch, as the stitch types of the left and right stitches, the horizontal size of the each stitch corresponds to a distance between the left and right stitches in said parallel plane, and when the each stitch is a different stitch type, a knit stitch or a purl stitch, from at least one of the stitch types of the left and right stitches, the each stitch is moved in the perpendicular direction, whereby a purl stitch burrows beneath a knit stitch, and the distance between said left and right stitches in said parallel plane decreases below the horizontal size of the each stitch in accordance with an amount of the each stitch movement in the perpendicular direction.

6. The loop simulation device of claim 1, further comprising:

means for determining an initial value of the position of the each stitch such that a distribution of the position of the each stitch does not deviate from a grid form, wherein the processing of said movement amount calculating means begins from said initial value.

7. A loop simulation method for determining and displaying an image of a knitting fabric corresponding to knitting fabric design data such that a loop of each stitch is represented, the method comprising the steps of:

moving each stitch of the knitting fabric such that distances between the each stitch and upper, lower, left, and right stitches satisfy a predetermined rule and a stitch orientation of the each stitch approximates stitch orientations of left and right stitches when the stitch orientation of the each stitch differs from the stitch orientations of the left and right stitches;

repeating the movement of the each stitch until a position of the each stitch is converged on a converged value; and displaying the each stitch arranged in the converged value being set as a stitch position.

8. The loop simulation method of claim 7, characterized in that during the movement of the each stitch, the each stitch is further moved such that an angle between the stitch orientation of the each stitch and a direction linking the each stitch to the left and right stitches approximates a right angle.

9. The loop simulation method of claim 7, further comprising the steps of:

determining the position of the each stitch including a position in a parallel plane to the knitting fabric and a position in a perpendicular direction to the knitting fabric;

not moving the each stitch in the perpendicular direction to the knitting fabric when the each stitch is the same stitch type, a knit stitch or a purl stitch, as the stitch types of the upper, lower, left, and right stitches; and moving the each stitch in said perpendicular direction when the each stitch is a different stitch type, a knit stitch or a purl stitch, from at least one of the stitch types of the upper, lower, left, and right stitches.

10. A computer-readable medium storing computer-executable instructions for determining and displaying an image of a knitting fabric corresponding to knitting fabric design data such that a loop of each stitch is represented, by performing operations comprising:

a command for moving the each stitch of the knitting fabric such that distances between the each stitch and upper, lower, left, and right stitches satisfy a predetermined rule and a stitch orientation of the each stitch approximates stitch orientations of left and right stitches when the stitch orientation of the each stitch differs from the stitch orientations of the left and right stitches;

a command for repeating the movement of the each stitch until a position of the each stitch is converged on a converged value; and a command for displaying the each stitch arranged in the converged value being set as a stitch position.

11. The computer-readable medium of claim 10, characterized in that in said command for moving the each stitch, the each stitch is further moved such that an angle between the stitch orientation of the each stitch and a direction linking the each stitch to the left and right stitches approximates a right angle.

12. The computer-readable medium of claim 10, characterized in that the position of the each stitch including a position in a parallel plane to the knitting fabric and a position in a perpendicular direction to the knitting fabric is determined, and in said command for moving the each stitch, the each stitch is not moved in said perpendicular direction when the each stitch is the same stitch type, a knit stitch or a purl stitch, as the stitch types of the upper, lower, left, and right stitches, and the each stitch is moved in said perpendicular direction when the each stitch is a different stitch type, a knit stitch or a purl stitch, from at least one of the stitch types of the upper, lower, left, and right stitches.

* * * * *